May 28, 1946. W. H. HUNTER 2,401,247
SPINNER ASSEMBLY
Filed Sept. 20, 1941 2 Sheets-Sheet 1
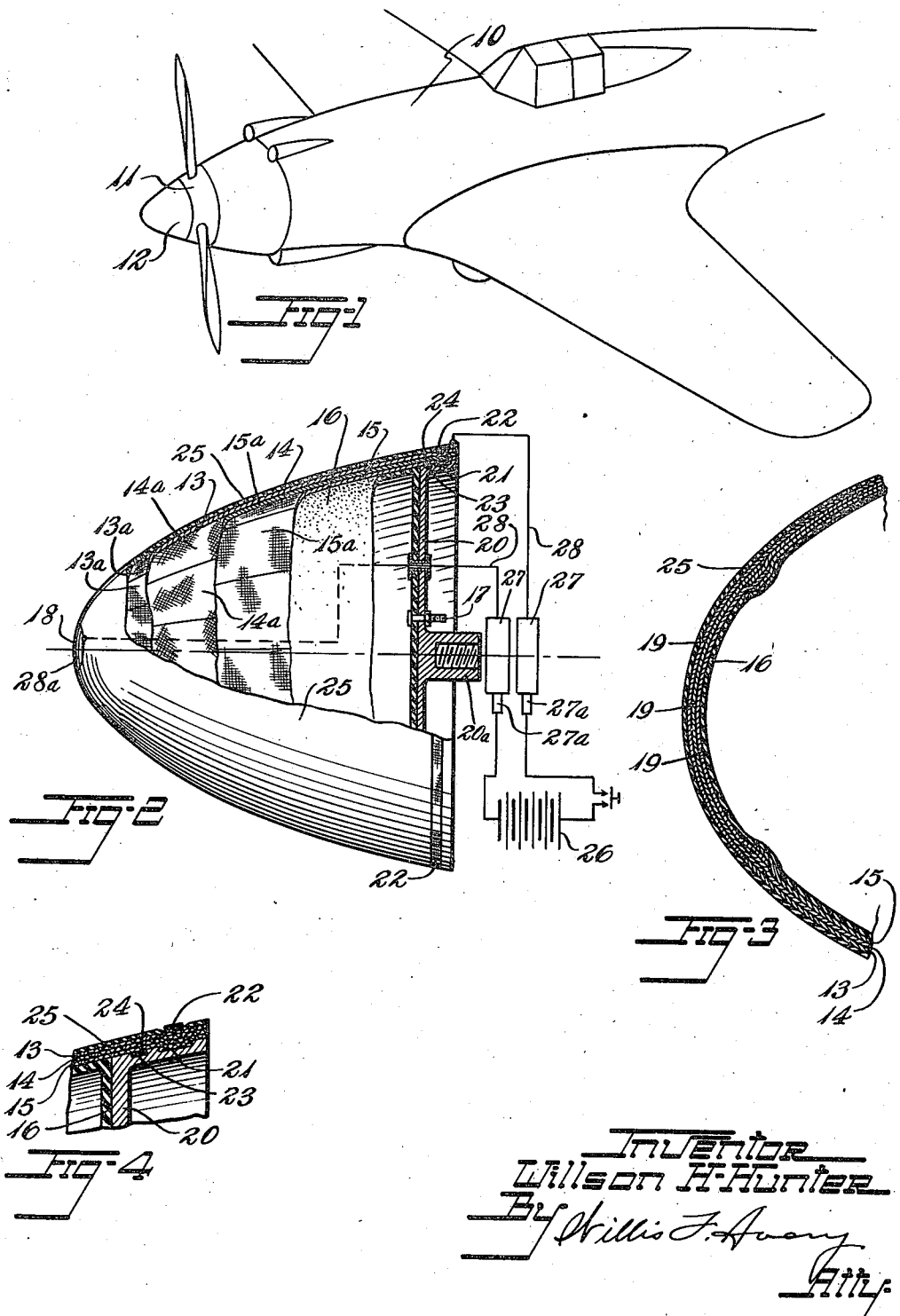

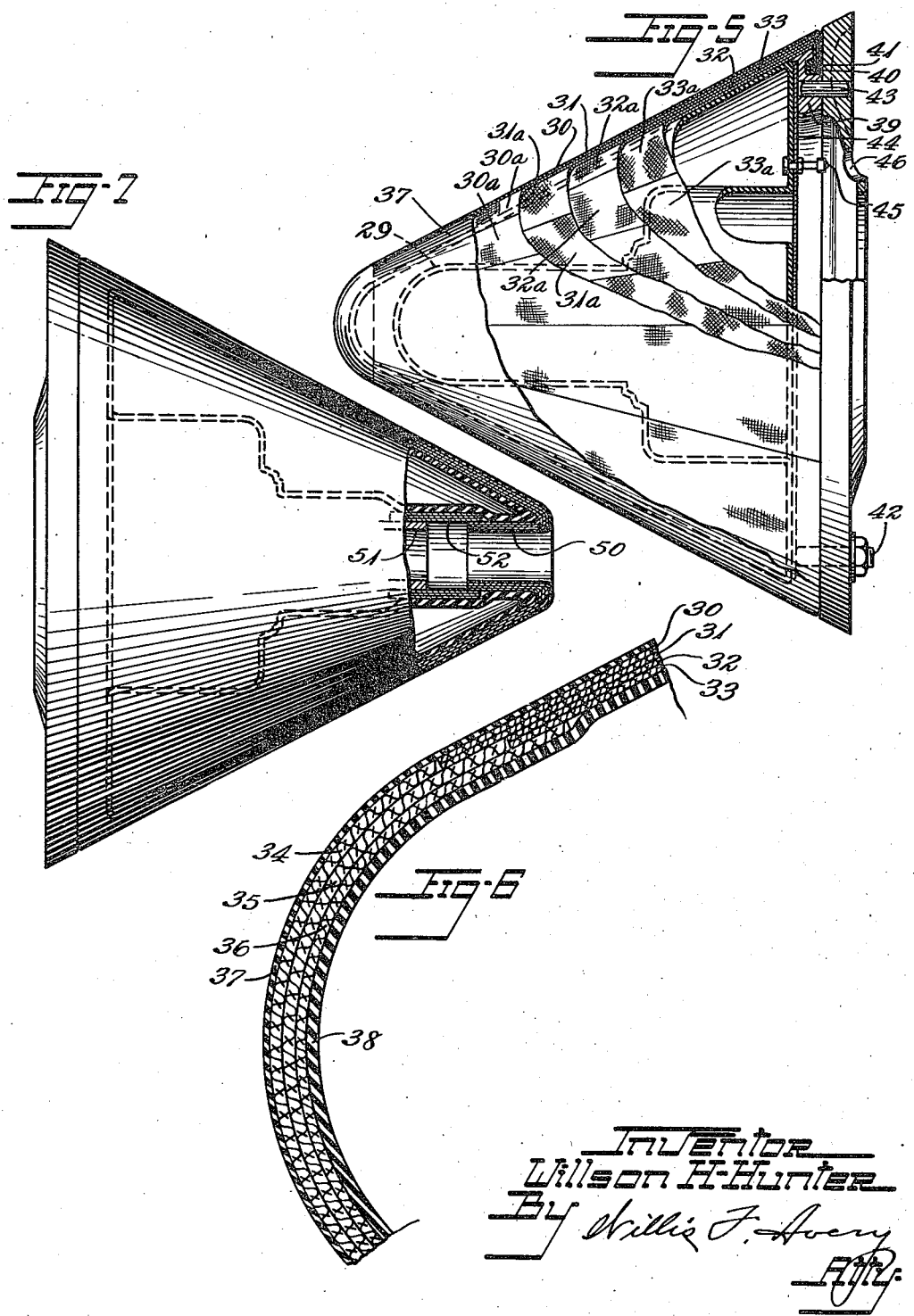

Patented May 28, 1946

2,401,247

UNITED STATES PATENT OFFICE 2,401,247

SPINNER ASSEMBLY

Willson H. Hunter, Akron, Ohio, assignor to The B. F. Goodrich Company, New York, N. Y., a corporation of New York Application September 20, 1941, Serial No. 411,688

13 Claims. (Cl. 244—134)

This invention relates to protective means, including spinner assemblies for protecting the hub portions of aircraft propellers, while maintaining effective aerodynamic characteristics of the same, and especially to preventing the accumulation of ice and snow at the hub portion of the propeller. Features of the invention are useful also at the noses of fuselages, nacelles and other parts of aircraft and other structures.

Ice accumulations on an aircraft propeller-hub heretofore have resulted in unbalance of the structure and objectionable engine vibration and also have increased the aerodynamic drag of smoothly streamlined assemblies.

The chief objects of the present invention are to provide for preventing the accumulation of ice on propeller hubs and other projecting structures; to provide for protection of the hub-portion of an aircraft propeller from impacts of cinders, stones and the like, while the plane is on the ground; to provide for protecting the same from excessive deposits of ice or snow and at the same time to provide for effective aerodynamic or streamline contour; to provide readily replaceable spinner means; to provide a flexible construction having sufficient inherent strength to withstand the forces encountered in use; to provide a light weight assembly; to provide for maintaining dynamic balance of the structure in use; to provide for ease of removal of the spinner to render covered parts readily accessible for servicing; and to provide for convenience of manufacture and assembly.

These and further objects will be apparent from the following description, reference being had to the accompanying drawings in which:

Fig. 1 is a perspective view of an airplane having a spinner mounted thereon, constructed in accordance with and embodying the invention.

Fig. 2 is a side elevation of the spinner of Fig. 1, parts being broken away and sectioned.

Fig. 3 is a fragmentary sectional view of the spinner on an enlarged scale.

Fig. 4 is a fragmentary sectional view of the spinner on an enlarged scale.

Fig. 5 is a view like Fig. 2, but of a modified construction.

Fig. 6 is a fragmentary sectional view of the embodiment of Fig. 5, on an enlarged scale.

Fig. 7 is a view like Fig. 2, but of a further modified construction.

I have found that the accumulation of objectionable quantities of ice on an airplane propeller hub assembly may be prevented by providing a spinner or fairing at the hub which is rotatable with the propeller and the surface of which is distortable to an extent such that ice formations will be broken-up and thrown-off the spinner. Various factors contribute to this result, singly or together, including vibration of the flexible surface, centrifugal force, steady and also variable rotational unbalance caused by the eccentricity of ice, and air flow over as well as air pressure against the surface. Under these various forces the flexible surface facilitates ice removal, and the propeller hub will be freed from excessive accumulations of ice which would be likely to result in undesirable unbalance of the propeller assembly and excessive vibration.

An airplane, indicated generally at 10, and having a propeller hub 11 with a nose spinner 12 constructed in accordance with the invention mounted thereon, is shown in Fig. 1 of the drawings. The spinner is desirably of a shape such that, under normal conditions of flight, it is adapted to direct the air encountered in the direction of the outer regions of the blades, which regions are most effective for propulsion. While a generally parabolic shape of spinner as here shown gives good results, the flexible spinner may, if desired, be more nearly conical in shape or hemispherical or any other suitable shape.

A spinner having the necessary shape-retaining rigidity and structural strength to withstand the forces encountered thereby in use, and yet having a desirable measure of distortability under such forces to break-up ice formations thereon, and to accomplish the other objects of my invention as hereinbefore stated may be provided by the construction shown in the illustrative embodiment of Figs. 2, 3 and 4. The construction as shown here, for example, comprises three layers 13, 14 and 15, of flexible reinforcing material, each layer being made up of twelve gores or pieces 13a, 13a, 14a, 14a, and 15a, 15a suitably secured together as by means of stitching, a vulcanized bond or other suitable means. The reinforcing material is preferably made up of square-woven fabric impregnated with rubber or other resilient rubber-like material. Some of the gores of the layers 13, 14 and 15 are desirably cut on the bias to provide for flexibility of the spinner, while others may be straight-cut to provide the construction with adequate rigidity to maintain the desired inflated shape. Thus, the extent of distortion of the surface is under the control of the designer, as desired.

While good results have been obtained with the three-layer construction having twelve gores to a layer shown in the drawings, any other suitable number of layers of rubberized reinforcing fabric material and any suitable number of gores in a layer may be employed, with the fabric of the gores straight-cut or cut on the bias. In the embodiment of Fig. 2 alternating layers of straight-cut and bias-cut fabric are shown, but this disposition may be varied, as desired. The gores as between layers may be in staggered relation as shown, or otherwise suitably disposed to provide a flexible, smooth and strong structure.

The spinner construction of Fig. 2 may be provided with a fluid-sealing inner-bag 16 of rubber or other resilient rubber-like material adapted to receive pressure-fluid through a valve 17 preferably provided in an unexposed side of the spinner, as shown. The inner-bag 16 may be secured to the inner wall of the spinner by means of a suitable adhesive, or if desired, the fluid pressure therein may be relied upon to hold the bag 16 in the desired shape against the spinner. The spinner may be filled with any suitable pressure-fluid such, for example, as air, or any other suitable gas, to provide the desired measure of shape-retaining properties to the structure while permitting sufficient distortion to break-up objectionable deposits of ice.

Alternatively, the body of the spinner may be made entirely fluid-tight, as by a rubber impregnated construction with an inflation valve in its wall, so that the provision of the inner-bag is unnecessary.

The ends of the gores 13a, 13a, 14a, 14a, and 15a, 15a, preferably terminate short of the apex 18 of the spinner with each layer or pairs of layers terminating at different places to avoid an objectionably bunched disposition of the gores. One or more disks, three of which are shown at 19, 19, for example, in Fig. 3, are mounted at the apex of the spinner in overlapping relation and are preferably intercalated with respect to the margins of the layers of rubberized fabric material 13, 14 and 15.

The spinner may be fixed to a mounting ring 20 or disk by any suitable means, for example, by means of a suitable adhesive, and a groove 21 in the mounting ring and a suitable band 22 adapted to encircle the base of the spinner and hold the same in the groove 21. An annular bead ring 23 may be provided on the inside surface of the base of the spinner and adapted to fit a matching groove 24 in the mounting ring 20 to facilitate centering of the spinner on the mounting ring 20 of the hub assembly to insure proper positioning of the spinner for dynamic balance of the assembled structure. The assembly is adapted to be mounted upon the end of the propeller shaft and for this purpose an internally threaded boss 20a may be provided centrally of the wall 20. If desired, a slide fastener or other suitable attaching means may be provided circumferentially of the spinner and preferably at the hub-end thereof to permit convenient assembly and removal.

The exposed surface 25 of an airplane propeller-hub spinner of the invention is preferably smooth and of oil and age-resistant material, such for example as Ameripol, neoprene or other suitable rubber-like material. With such a surface the adhesion of ice and snow to the surface 25 may be made low so that distortion of the spinner due to the pressure of the air, the centrifugal forces of rotation and engine vibrations, together with the airflow thereover, will be effective to remove snow and ice from the spinner. Under severe icing conditions, heavy deposits which may form quickly can be broken-up by changing the speed of rotation to effect sudden variations in centrifugal force at the exposed surfaces of the spinner.

The surface material 25 of the spinner may be coated or impregnated with suitable electrically conducting material, for example, material as disclosed in the R. A. Crawford Patent No. 2,167,972, granted August 1, 1939, to prevent the accumulation of static electricity upon the spinner surface.

The electrically conducting surface material may also be used advantageously for applying heat at the outer surface of the spinner as for example by a source of electrical power, indicated at 26 in Fig. 2, slip rings 27, 27 and brushes 27a, 27a connected by wires 28, 28 to the electrically conductive surface of the spinner through a metal connection 28a in communication with the surface as at the apex 18 of the spinner. The metal connection 28a is insulated from contact with the metallic structure of the hub assembly. A sufficient temperature increase may be provided by this expedient at least to loosen the bond of ice formations at the spinner surface to expedite ice removal.

Alternatively, anti-freeze liquid may be fed onto the spinner surface from feeding means within the assembly through suitable openings in the spinner, for example through an opening at the apex 18 for effecting a weakening of the bond between ice and spinner.

The flexible spinner of the invention has the further advantage that the propeller-hub is protected from damage due to impacts from stones, gravel and the like, and also that the spinner is easily removable for servicing and replacement.

In the construction of Fig. 5 of the drawings is shown an embodiment of a distortable spinner mounted on one type of airplane propeller hub assembly and over a housing 29 of a motor and transmission system for varying the pitch of the propeller blades. The construction shown here comprises four layers 30, 31, 32 and 33 of square-woven fabric impregnated with rubber or other rubber-like material, alternate layers 31, 33 being laid on the bias for flexibility of the structure and other layers 30, 32 being laid on the straight to provide the desired degree of shape-retaining rigidity. The layers 30, 31, 32 and 33 are preferably constructed of a plurality of gores disposed with the seams of the gores as between layers in staggered relation circumferentially about the spinner. In the embodiment of Fig. 5 each layer comprises eight gores 30a, 30a, 31a, 31a, 32a, 32a, and 33a, 33a. To prevent undesirable bunching of the gores at the nose of the spinner, nose pieces in the form of disks 34, 35 and 36 are provided with their margins in staggered relation and overlying the layers 30, 31, 32 and 33, details of construction of which are shown in Fig. 6 of the drawings.

A layer 37 of rubber or other rubber-like material presenting a surface having low adhesion to ice overlies the layers of fabric and the nose disks and, if desired, may be impregnated with electrically conductive material at the surface.

An inner-bag 38 of air-tight material is provided at the inner wall of the spinner to hold air under pressure.

The distortable spinner may be secured to the hub assembly by any suitable means, for example, by means of a mounting ring 39 as shown in Fig. 5. The margin of the spinner is provided with a bead portion 40 adapted to fit a groove 41 in the inward face of the mounting ring 39. The mounting ring 39 is adapted to be fastened to the hub assembly as by means of bolts, one of which is shown at 42, or by other suitable attaching means and one or more centering pins 43 may be provided to facilitate assembly. A bulkhead plate 44 is provided in the spinner and may be attached to the mounting ring 39 to back the inner-bag 38 of the spinner. A suitable valve 45 is provided rearwardly of the spinner and extending through the bulkhead 44 and in communication with the inside of the inner-bag 38 to permit the passage of air under pressure. A suitable opening 46 may be provided in the hub assembly to permit access to the valve 45 for inflation.

A distortable hub spinner constructed to receive a hub cannon is shown in Fig. 7. The gores are faired inwardly at the nose of the spinner to provide an opening 50 and an opening 51 is provided in the shaft of the pitch-varying motor to permit the insertion of a cannon or passage of projectiles. A flexible connection 52 closing the space between the opening 50 in the nose of the spinner and the opening 51 in the motor shaft is provided to accommodate relative movement between the motor and the spinner and to seal the cannon passage. A suitable flexible connection may be a segment of hose of rubber or rubber and fabric material as shown at 52.

The pneumatic spinner is preferably constructed and cured inside-out and is inverted after cure to the form, for example, of the embodiment of Figs. 5 and 6 of the drawings. A smooth, polished building-form of metal or other suitable material and having the desired spinner shape is used and the coats of electrically-conducting substance and rubber-like surface material 25 are disposed as by spraying, dipping or other suitable means on the building-form. Next, the nose disk 34 and the gores 30a, 30a, and 31a, 31a, of the layers of fabric 30 and 31 are added, then the nose disk 35, the gores 32a, 32a, and 33a, 33a, of the fabric layers 32 and 33, and finally the last nose disk 36. The layer 38 of rubber-like material may be added to the structure before cure, or may be added to the assembly as a separate air-bag after cure, as desired. Strips of rubber-like material or tapes may be disposed over the seams between gores to prevent the possibility of cure blisters at the seams, if desired.

The pneumatic spinner is preferably constructed slightly undersize to permit some distortion to the desired shape under inflation. However, the degree of stretch permitted is preferably limited to 5% or under so that the desired spinner shape of the structure is maintained in use.

The pneumatic spinner is lightweight in contrast to all-metal spinner constructions used heretofore and is self-balancing and not objectionably responsive to engine vibrations.

Variations may be made without departing from the scope of the invention as it is defined by the following claims.

I claim:

1. An enclosing fairing for an aircraft propeller-hub, said fairing comprising a hollow streamlined body of fabric and rubber-like material open at the rear margins thereof and closed at its front end, means at said rear margins for closing the rear end of the fairing and attaching the same to a propeller-hub for rotation therewith, the outer surface of the fairing presenting an outer surface of revolution coaxial with the propeller, and means including a flexible fluid-sealing member for inflating said body to impart shape-retaining stiffness thereto to maintain a streamlined shape of said body at the surface of revolution while permitting distortion thereof.

2. A fairing as defined in claim 1 in which said body comprises means for heating the surface thereof.

3. A fairing as defined in claim 1 in which said body comprises means for heating the surface thereof electrically.

4. Means for preventing accumulation of ice on a propeller hub of aircraft, said means comprising a streamlined inflatable body of resilient rubber-like material, and means at the rear-end thereof for attaching said body to a propeller-hub for rotation therewith, said resilient material being reinforced by fabric material to limit the extensibility thereof while permitting distortion thereof and presenting an outer surface of revolution coaxial with the propeller.

5. Means for preventing accumulation of ice on a propeller hub of aircraft, said means comprising a hollow streamlined body of resilient rubber-like material having an outer surface of revolution and open at the rear-end thereof, means at said rear-end for attaching said body to a propeller-hub for rotation of said surface coaxially with the propeller, and means for inflating said body to impart shape-retaining stiffness thereto to maintain a streamlined shape of said body while permitting distortion thereof, the resilient rubber-like material of said body being reinforced by fabric material to limit the extensibility thereof to restrict the extent of distortion thereof.

6. Means for preventing accumulation of ice on a propeller-hub of aircraft, said means comprising a wall at the forward-end of the propeller hub, a hollow streamlined flexible body of flexible material attached to and extending forwardly of said wall in a manner to form a hollow chamber and present an outer surface of revolution coaxial with said propeller, a flexible fluid-sealing member in said chamber, means in said wall for inflating said fluid-sealing member to impart shape-retaining stiffness to said body to maintain a streamlined shape thereof while permitting distortion thereof, the flexible material of said body being reinforced by fabric material to limit the extensibility thereof to restrict the extent of distortion of the body.

7. The method of preventing the accumulation of ice upon a structure which comprises mounting upon said structure a streamlined fairing having a flexible wall presenting a surface of revolution, inflating said fairing to stiffen it and rotating the fairing about its axis of revolution under changing speeds and thereby changing the shape of the flexible wall to break up and dislodge ice formations.

8. A propeller nose spinner comprising a hollow body the wall of which is flexible and shaped to present a streamlined surface of revolution, means for mounting said body to project forwardly of the propeller and for rotation of its streamlined surface of revolution coaxially with the propeller, said body by virtue of the flexibility of the wall thereof being subject to change of shape under change of centrifugal force incident to change in the speed of rotation.

9. A propeller nose spinner comprising a hollow body the wall of which is flexible and shaped to present a streamlined surface of revolution, said wall comprising flexible composition and a reinforcement of flexible material, means for mounting said body to project forwardly of the propeller and for rotation of its streamlined surface of revolution coaxially with the propeller, said body by virtue of the flexibility of the wall thereof being subject to change of shape under change of centrifugal force incident to change in the speed of rotation.

10. A propeller nose spinner comprising a hollow body the wall of which is flexible and shaped to present a streamlined surface of revolution, said wall comprising flexible composition and a fabric-reinforcement therefor, means for mounting said body to project forwardly of the propeller and for rotation of its streamlined surface of revolution coaxially with the propeller, said body by virtue of the flexibility of the wall thereof being subject to change of shape under change of centrifugal force incident to change in the speed of rotation.

11. A propeller nose spinner comprising a hollow body the wall of which is flexible and shaped to present a streamlined surface of revolution, means for mounting said body to project forwardly of the propeller and for rotation of its streamlined surface of revolution coaxially with the propeller, and means for inflating said body to impart shape-retaining stiffness thereto while permitting change of shape of said wall by virture of the flexibility thereof under change in the speed of rotation.

12. A propeller nose spinner comprising a hollow body the wall of which comprises a fabric-reinforced flexible composition and is shaped to present a streamlined surface of revolution, means for mounting said body to project forwardly of the propeller and for rotation of its streamlined surface of revolution coaxially with the propeller, and means for inflating said body to impart shape-retaining stiffness thereto while permitting change of shape of said wall by virtue of the flexibility thereof under change in the speed of rotation.

13. A propeller nose spinner comprising a hollow body the wall of which is flexible and shaped to present a streamlined surface of revolution, means for mounting said body to project forwardly of the propeller and for rotation of its streamlined surface of revolution coaxially with the propeller, means for inflating said body to impart shape-retaining stiffness thereto while permitting change of shape of said wall by virtue of the flexibility thereof under change in the speed of rotation, the flexible walls of said body comprising electrically conductive material and means for passing a heating current through said material to heat said surface.

WILLSON H. HUNTER.